(12) United States Patent
Hodge

(10) Patent No.: US 12,512,013 B2
(45) Date of Patent: Dec. 30, 2025

(54) METHOD AND APPARATUS FOR ORAL ACCLIMATION TRAINING

(71) Applicant: Prozaz, LLC, Middletown, NJ (US)

(72) Inventor: James Hodge, Middletown, NJ (US)

(73) Assignee: Prozaz, LLC

( * ) Notice: Subject to any disclaimer, the term of this patent is extended or adjusted under 35 U.S.C. 154(b) by 1037 days.

(21) Appl. No.: 17/564,292

(22) Filed: Dec. 29, 2021

(65) Prior Publication Data

US 2022/0208021 A1 Jun. 30, 2022

Related U.S. Application Data

(60) Provisional application No. 63/132,272, filed on Dec. 30, 2020.

(51) Int. Cl.
*G09B 19/00* (2006.01)
(52) U.S. Cl.
CPC .................... *G09B 19/00* (2013.01)
(58) Field of Classification Search
None
See application file for complete search history.

(56) References Cited

U.S. PATENT DOCUMENTS

| | | | | |
|---|---|---|---|---|
| 5,590,643 A | * | 1/1997 | Flam ................. | A61M 16/0488 128/207.14 |
| 2007/0016216 A1 | * | 1/2007 | Tague ................ | A61B 17/8808 606/94 |
| 2010/0326435 A1 | * | 12/2010 | Filipi ................ | A61M 16/0493 128/207.14 |
| 2011/0126840 A1 | * | 6/2011 | Ogilvie ............ | A61M 16/0493 128/207.14 |

* cited by examiner

*Primary Examiner* — James B Hull
(74) *Attorney, Agent, or Firm* — Gearhart Law LLC

(57) ABSTRACT

The suppression of the gag reflex response, administered through a training device and associated desensitization method(s), without medical intervention, is desirable for many people who suffer from gag reflex response issues. An oral acclimation training device comprise various thickness(es) and length(s) and may have components to prevent swallowing or choking of the device by the user. Further, the device may be part of a kit having multiple training objects with specific attributes (e.g. thickness, depth, shape, finish, texture) that are designed for a specific stage in the training sequence and tailored for the user's inherent gag reflex sensitivity. Training objects are designed to provide optimal stimulus range to cause desensitization but not cause severe gagging or vomiting. The gag suppression stemming from this device is long-term, meaning that it may last for many weeks or months, depending on the individual. This duration may be extended indefinitely by occasional re-training or similar conditioning.

2 Claims, 21 Drawing Sheets

FIGURE 6
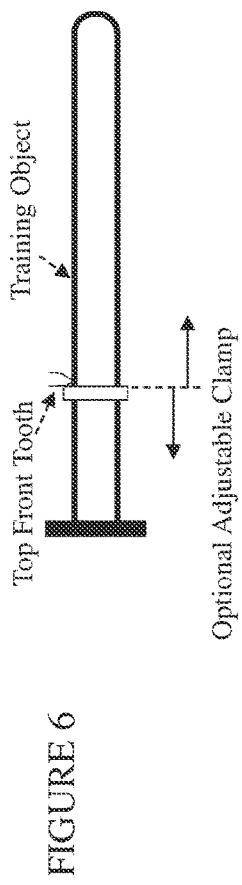
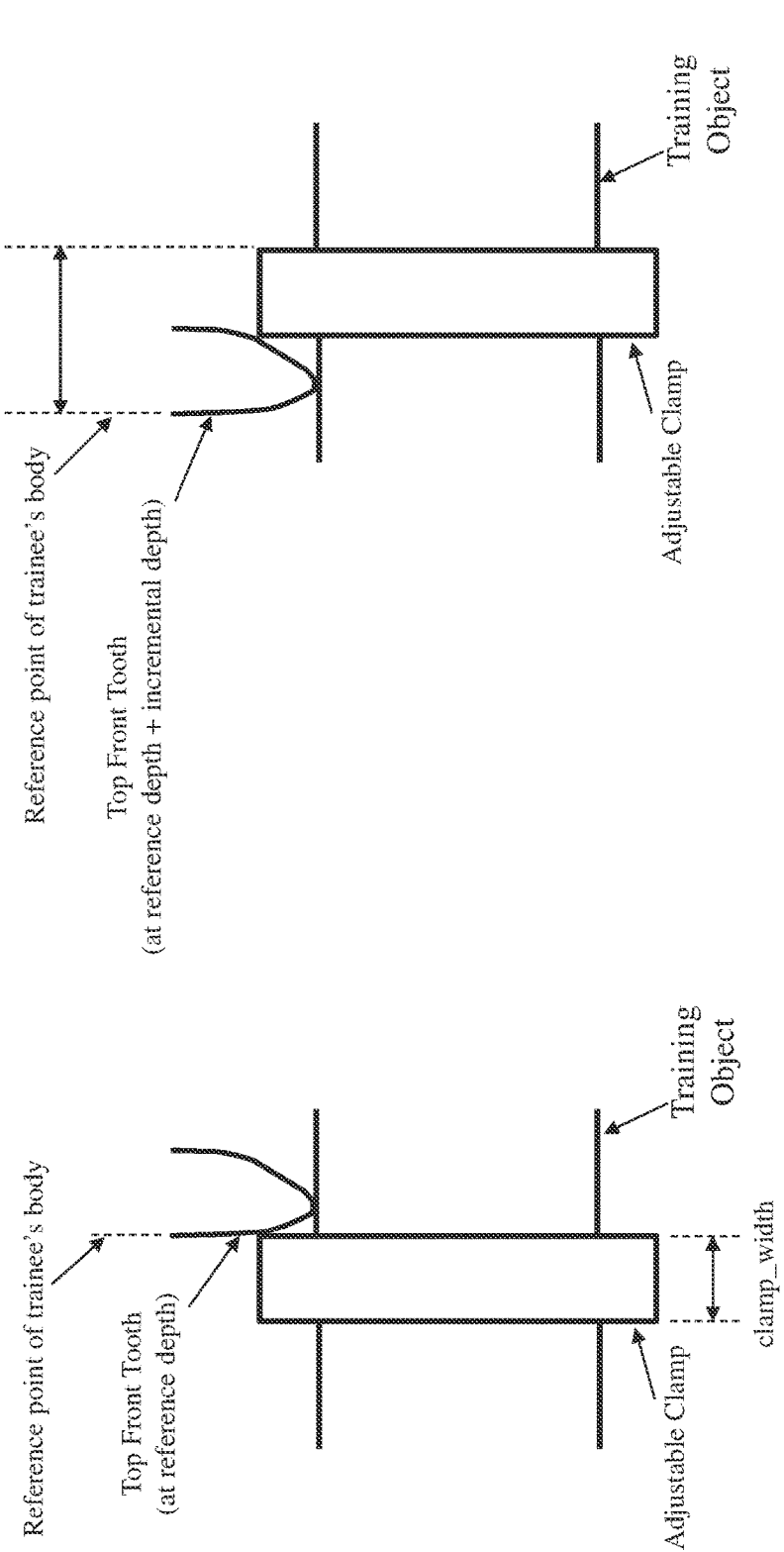

METHOD AND APPARATUS FOR ORAL ACCLIMATION TRAINING

CLAIM OF PRIORITY

This application claims priority to U.S. Application Ser. No. 63/132,272 filed on Dec. 30, 2020, the contents of which are herein fully incorporated by reference in its entirety.

FIELD OF THE EMBODIMENTS

The field of the embodiments of the present invention relate to a person's acclimation to a presence of a target/representative object in their mouth or throat, through a self-administered training device and associated desensitization methods and training exercises. Acclimation includes but is not limited to suppressing the gag response associated with the target/representative object.

BACKGROUND OF THE EMBODIMENTS

The gag reflex, also known as a pharyngeal reflex or laryngeal spasm, is an uncontrollable reflex contraction of the back of the throat. Gagging and/or vomiting is sometimes experienced by people who engage in at least the following activities: swallowing pills, or other cases when something unusual enters the mouth (e.g. dentures); dental procedures including impressions, dental x-ray preparation; brushing/flossing teeth; using an intraoral appliance for sound transmission (e.g. microphone inside the mouth); scuba diving (mouthpiece); medical procedures including gastric tube (feeding tube) insertion, and fellatio.

The two main categories of gagging are somatogenic (induced by physical stimuli) and psychogenic (induced by psychological stimuli). Somatogenic gagging is typically caused by a physical stimulus applied to one of the five main gag "trigger zones" in the intraoral area, specifically the palatoglossal and palatopharyngeal folds, base of tongue, palate, uvula and posterior pharyngeal. Psychogenic gagging is induced primarily by psychological stimulus, meaning without direct, physical contact. Example stimulus types include visual (e.g. sight of a dental instrument), auditory (e.g. sound of dental equipment), olfactory stimuli (e.g. smell of dental equipment or other unpleasant smells) or thought (e.g. remembering a previous gagging experience or even imagining oneself gagging or vomiting). Psychological factors associated with a person's gag experiences, include fear, anxiety, apprehension, and sexual abuse. Classical conditioning can result when an originally neutral stimulus becomes associated with a gag response. Such accumulated, negative gag experiences become a "learning history" which can contribute to psychogenic gagging. Such past negative experiences can increase the expectation and probability of future gagging.

Pharmacological, behavioral modification, and other techniques have been used to suppress the gag reflex. Pharmacological techniques have included local anesthetics and conscious sedation. Behavioral modification techniques have included relaxation, distraction, suggestion and hypnosis, sensory flooding, and cognitive behavioral therapy. Systematic desensitization and errorless learning are behavioral modification techniques which have been shown to be successful for long-term desensitization.

Besides pharmacological and behavioral modification, other techniques to manage the gag reflex include the use of salt on the tip of the tongue, a transcutaneous electric nerve stimulation (TENS) device, acupressure/acupuncture, acupuncture, hypnosis, and red light soft magnetic field laser stimulation.

Examples of related art include:

U.S. Pat. No. 10,485,730 which pertains to an adjustable girth dildo, consisting of a multilayered cylindrical shaft with a proximal end and a distal end. The dildo consists of layers, which can be applied or removed, allowing for increase or decrease adjustments to the girth of the cylindrical shaft. Apart from having these layers, the dildo can have two applicable embodiments. In the first embodiment, all layers of the dildo from the distal end to proximal end are hollow, like a snorkel with two openings at each end, for the ability to breathe through. In the second embodiment, the innermost layer of the dildo that runs the length of the cylinder is solid, while each additional layer has one opening at the proximal end, without the ability to breathe through.

U.S. Pat. No. 5,203,703A pertains to a method and apparatus of teaching pill swallowing by initially administering very small, usually hollow, pills and increasing the pill size gradually during the learning period. U.S. Pat. No. 8,808,324 pertains to a method and device for reducing gag reflex by applying pressure to a pressure point in the palm of the hand. A splint that holds the hand relatively immobile has a rigid member and an actuating pressure system, such as a solenoid, at the pressure point. The rigid member at least partially immobilizes the human user's palm and fingers. The actuating pressure system is mounted at an inner side of the volar side of the enclosure adjacent to a pressure region of the palm. A power supply is connected to the actuating pressure system to apply an electrical current to the pressure system, which exerts pressure to the pressure region of the user's palm to diminish or normalize the user's gag reflex response;

U.S. Patent Application 2017/0238955 pertains to a device with a removable and replaceable cleaning head for cleaning a surface. The cleaning head has a spoon shaped head section configured to be operable to reduce a user's gag reflex. A cleaning blade segment is configured to form a triple edged surface scraping implement and a ball base segment is configured to aid a user in the installation and removal of said cleaning head component. A base component is configured to attach to said cleaning head component including a motor that is configured to vibrate said cleaning head component at a predetermined rate of a direction of motion of said cleaning head. An indicator indicates a status of said device;

U.S. Patent Application 2009/0130637 pertains to a tongue cleaning device that reduces or eliminates the gag reflex during use comprising, a body having a first end and a second end. The first end forming an elongated handle having a contour for ease of handling and use and a gripping means. The second end forming a head having two or more elongated apertures forming at least two parallel ridges perpendicular to the handle. The head being flat and narrow in width and the body being narrow in thickness thereby eliminating or reducing the gag reflex during use.

However, nearly all the aforementioned gag-suppression techniques require intervention by one or more specialists in the field of dentistry, medicine, psychology, acupuncture, acupressure, or hypnosis. One goal of the present application is to contribute to applications of systematic desensitization and errorless learning that can be performed without specialist intervention. The embodiments of the present application, based on systematic desensitization and errorless learning, are self-administered, and provides effective, long-term desensitization for the mouth and throat. Systematic desensitization and errorless learning do not have safety concerns such as those associated with pharmacological techniques.

Thus, as noted above, various systems and methodologies are known in the art. However, their structure and means of operation are substantially different from the present disclosure. The other inventions fail to solve all the problems taught by the present disclosure. At least one embodiment of this invention is presented in the drawings below and will be described in more detail herein.

SUMMARY OF THE EMBODIMENTS

The present invention and its embodiments relate to a self-administered training device and method configured to achieve long term acclimation of a target object in a person's mouth and/or throat (including the suppression of the gag response associated with that object) while significantly reducing the discomfort that is typically associated with traditional gag suppression training. Training with the embodiments of the present invention can, for example, enable a person to perform fellatio with minimal or no gagging up to the trained depth and width. Systematic desensitization and errorless learning are prescribed methods used by the user to gently acclimate to an aversive stimulus. Persons with various gag sensitivities including those with a very sensitive gag reflex can be accommodated.

In at least one embodiment of the present invention, the training device comprises multiple training objects with specific attributes (e.g. diameter, texture, length, shape, durometer) that are designed for: (1) a specific stage in the training sequence; and (2) the user's inherent gag reflex sensitivity. Training objects provide optimal stimulus range which is sufficiently averse to cause desensitization but not excessive enough to cause severe gagging or vomiting.

The user uses these training device(s) to administer their own gradual and precise stimulus control, thereby reducing discomfort (e.g. indiscriminate gagging) during training. Daily training is easy, self-administered, and self-paced. Virtually any depth of the mouth and throat can be treated, from shallow (e.g. for denture applications) to depths beyond the back of the throat (for fellatio applications). The number of days required for acclimation will depend on the user's goals (e.g. depth, width), inherent gag reflex sensitivity and training persistence, which may last for weeks or months. A training device can be used stand-alone, or as part of a collection (i.e. a training kit) of objects each of which have unique attributes. Once training is completed, a user's suppressed gag reflex will not change if they periodically re-condition themselves using the embodiments of this invention or a similar stimulus (e.g. actual fellatio). The user's gag reflex will gradually return to its original level of sensitivity over time if the user were to stop exercising this skill.

In one embodiment of the present invention, there is an oral acclimation training device having a device body with a first (proximal) end, a second (distal) end, and a length; a retainment protrusion coupled to a first end of the device body, wherein the retainment protrusion has a width larger than that of the device body; and an adjustable clamping mechanism configured to be selectively retained along a length of the device body.

In another embodiment of the present invention, there is an acclimation device having a device body made from a flexible and resilient material, the device body having a first end, a second end, a thickness, and a length; a retainment protrusion directly affixed to a first end of the device body, wherein the retainment protrusion has a width that is wider than that of the device body; and an adjustable clamping mechanism configured to be selectively retained along a length of the device body, wherein the adjustable clamping mechanism comprises at least one indentation configured to receive at least one tooth of a user.

In yet another embodiment of the present invention, there is an oral acclimation training device having a device body made from a flexible and resilient material, the device body having a first end, a second end, a thickness, and a length; a retainment protrusion directly affixed to a first end of the device body, wherein the retainment protrusion has a width that is wider than that of the device body; and an annular clamping mechanism configured to be selectively retained along a length of the device body, wherein the annular clamping mechanism further comprises at least one retainment indentation on an outer surface of the annular clamping mechanism configured to receive at least one tooth of a user.

It is an object of the present invention to provide an oral acclimation training device that can be used safely and comfortably anywhere (e.g. in the user's home).

It is an object of the present invention to provide an oral acclimation training device that is designed for a specific stage in the training sequence.

It is an object of the present invention to provide an oral acclimation training device that has various features to help desensitize and retrain a user's gag reflex for acclimating to the target object.

It is an object of the present invention to provide an oral acclimation training device that is lightweight and comfortable to use.

It is an object of the present invention to provide an oral acclimation training device that may have varying thicknesses.

It is an object of the present invention to provide an oral acclimation training device that may exhibit varying textures.

It is an object of the present invention to provide an oral acclimation training device that may have varying shapes.

It is an object of the present invention to provide an oral acclimation training device that may have varying lengths.

It is an object of the present invention to provide an oral acclimation training device that have safety features to prevent choking and/or swallowing of the device.

It is an object of the present invention to provide an oral acclimation training device that can provide a custom treatment methodology to a particular user.

BRIEF DESCRIPTION OF THE DRAWINGS

FIG. 6 is a diagram illustrating oral acclimation training using depth control and an optional clamp.

DESCRIPTION OF THE PREFERRED EMBODIMENTS

Figure 1:
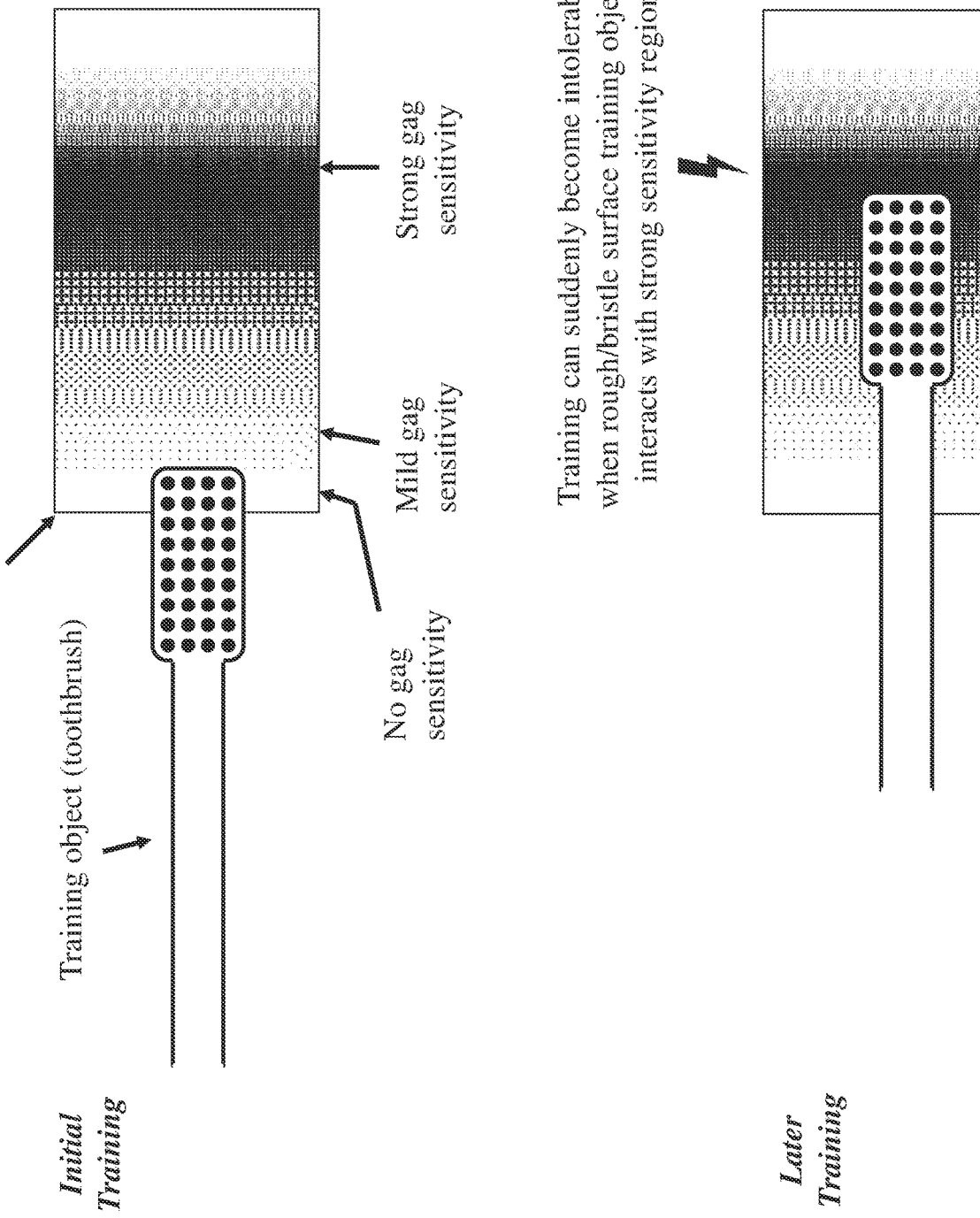
FIG. 1 is a diagram illustrating how a known rough stimulus can cause gagging or other discomfort to a person.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Training Device

Systematic gag desensitization requires an aversive stimulus in the training process. The two most known and commonly referenced objects used for fellatio training are toothbrushes (typically intended for shallow depths of the mouth and throat) or dildos (intended to reach further depths of the throat). Both methods may be regarded as "incrementing depth" approaches since the aversive stimulus is initially administered at the front of the mouth (usually with little aversion) and gradually progress toward the back of the mouth and throat (usually with intense aversion).

Figure 2:
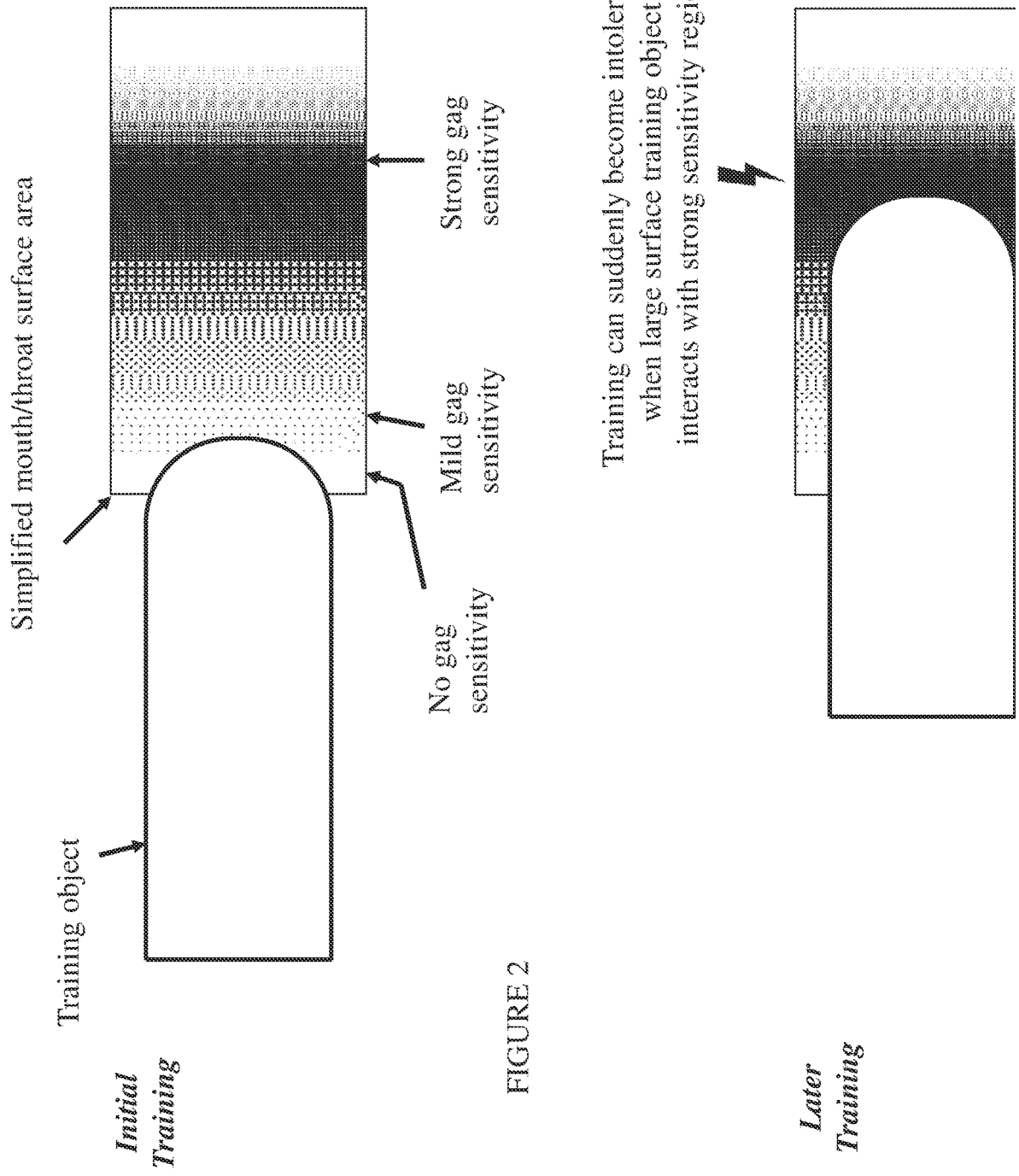
FIG. 2 is a diagram illustrating how a known larger stimulus can cause gagging or other discomfort to a person.

These techniques are problematic because the user's experience often includes gagging and/or vomiting as these training objects interact with highly sensitive gag reflex areas. Such repeated negative experiences contribute to a user's learning history and can contribute to a psychogenic gag response. Traditional fellatio training methods, relying on a toothbrush or dildo can be troublesome for the user because: 1) these techniques have unconstrained control, meaning the user has imprecise and inconsistent positioning control (via their hand) of the training object; 2) gag sensitivities of the five trigger zones may be non-linear and non-monotonic, thereby making it difficult for a person to discern, predict and condition them; 3) these training objects provide intense stimulus, which easily invokes gagging when touching highly sensitive areas; 4) a toothbrush produces intense stimuli because of its rough, bristle texture (see FIG. 1); and 5) a dildo produces intense stimuli because it has a large surface area (see FIG. 2). For the reasons listed above, traditional training with a toothbrush or dildo can often cause intense discomfort and distress. A user often finds this intolerable, resulting in limiting or discontinuing training.

However, the present invention and its embodiments comprise a collection of training objects used for gag suppression generally using the method of systematic desensitization. Training objects are used to produce gradual, precise, repeatable, and progressively increasing stimulus. Stimulus progression is achieved by constructing training objects with specific controls such as thickness, depth, shape, finish, and texture. These controls are varied in specific ways to achieve the user's goals (e.g. acclimation to a target object), and to accommodate the user's gag sensitivity level. These controls can be used separately but some may be combined. Each control is described below. Training objects consist of a soft material (e.g. silicone). Training objects may be molded, cut and/or shaped in a variety of ways including the use of an abrasive materials.

Figure 3:
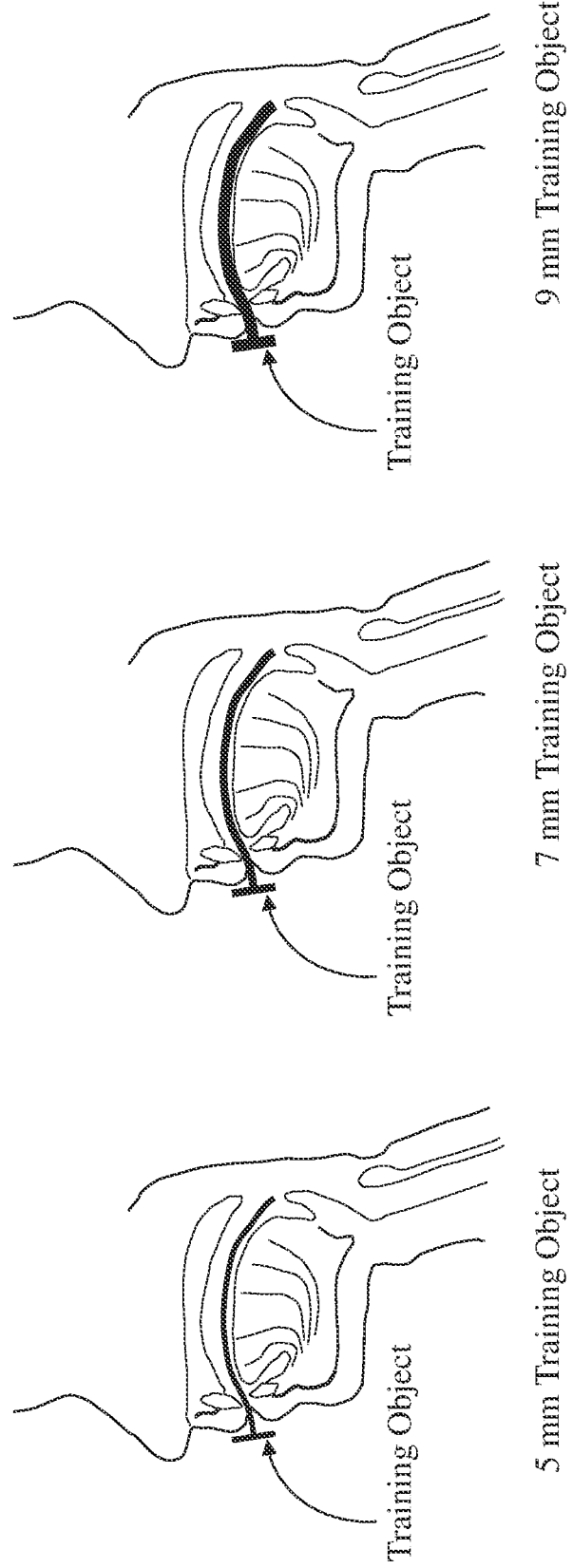
FIG. 3 is a diagram setting forth examples of oral acclimation training using a device of varying thickness.

"Thickness control" refers to one or more training objects that provide stimulus progression through thickness expansion as shown in FIG. 3. This may be achieved using several constructed training objects, each of which have a different thickness. Such thickness control is inherently precise and repeatable. The collection of training objects forms an overall progressive thickness expansion. Training begins with a training device that has a low coefficient of friction and is thin enough to provide passage through the mouth and throat with minimal or no discomfort.

A user inserts the training device into their mouth at the desired depth and repeats this exercise until they have acclimated to it. The user then continues training with the next thicker training object. They may initially experience some discomfort, because newly touched sensory nerve receptors are being stimulated, but the user eventually acclimates to it after repeated exercises (i.e. ending the discomfort). The process continues with the next thicker training device and so on, using several training objects, until the user has acclimated to the final desired thickness. The thickness progression can be tailored to the user's gag reflex. For example, a person with a highly sensitive gag reflex may use thickness increments which are small enough to be nearly imperceptible. Such a progression is therefore very gradual. A person with a low sensitivity gag reflex may use larger thickness increments, forming a more precipitous progression. Using larger thickness increments may mean that fewer training objects are needed, thereby saving cost.

Figure 4:
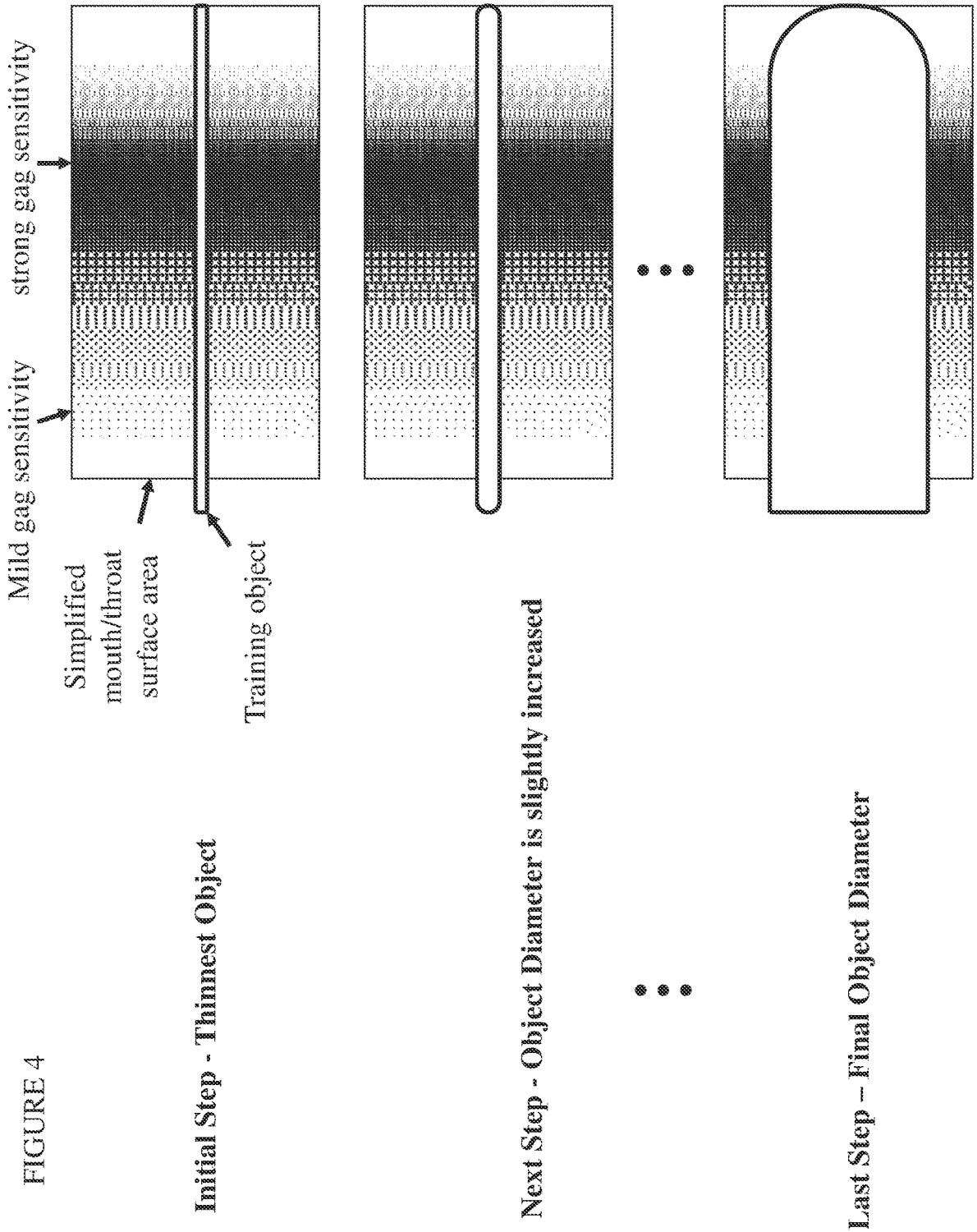
FIG. 4 is a diagram illustrating oral acclimation training using thickness control.
Figure 5:
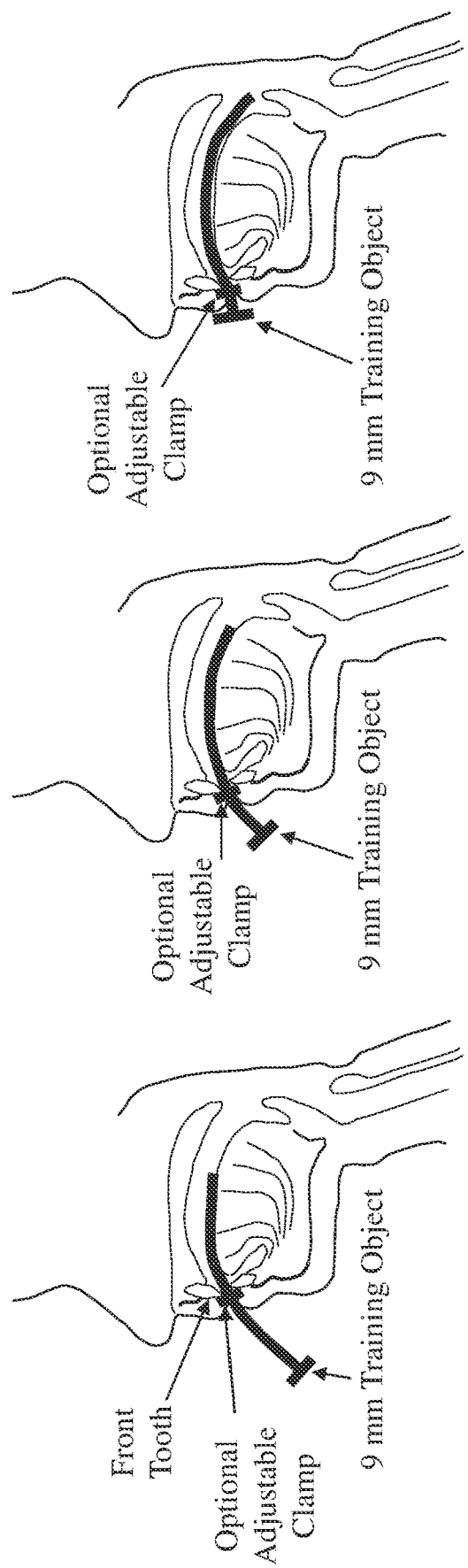
FIG. 5 is a diagram setting forth examples of an oral acclimation training using a device of varying insertion depth.

"Depth control" refers to a precise and repeatable means of controlling a training object's depth into the mouth and throat as shown in FIGS. 4 and 5. Depth progression can be tailored to the user's gag reflex. For example, a person with a highly sensitive gag reflex may use depth increments which are small enough to be nearly imperceptible. Such a progression is very gradual. A person with a low sensitivity gag reflex may use larger depth increments, forming a more precipitous progression. Depth control may be implemented with a small adjustable clamping device that can be precisely positioned anywhere along the length of the training device. The clamp is similar to a hose clamp, releasable cable tie, or comparable device, that securely attaches to the training object. The user inserts the training device into their mouth until they feel the clamp touching their front tooth. The front tooth, therefore, serves as a reliable and precise reference for depth control.

Figure 7:
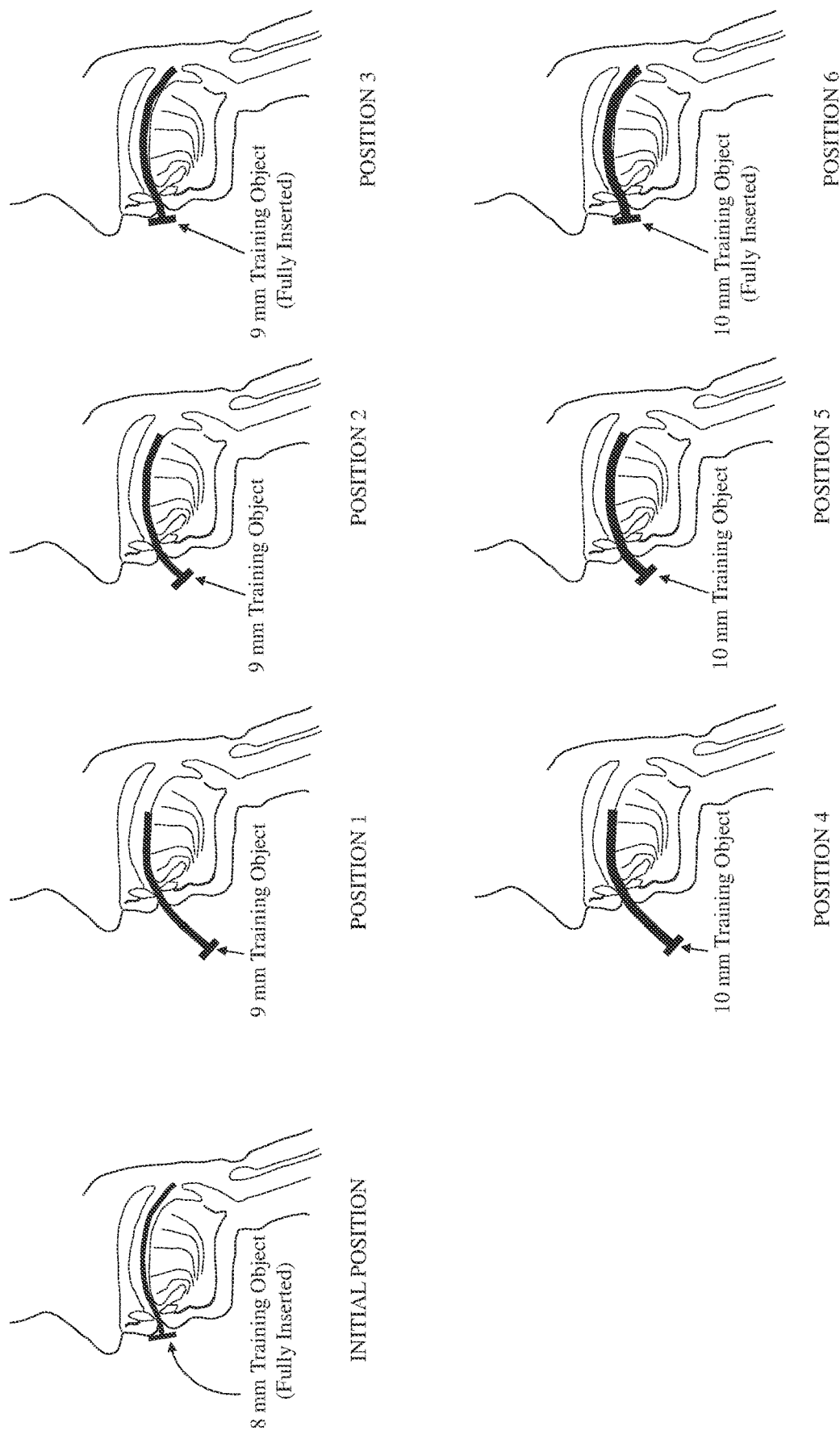
FIG. 7 is a diagram setting forth examples of oral acclimation training using both thickness and depth.

Referring back to FIG. 7, shown are implementations incorporating both thickness control and depth control. For example, a user may have acclimated to a thickness of 8 mm and a final desired depth of 16 cm, in the training progression. Assuming that the user's next training device is 9 mm, but the user feels or expects to feel discomfort with the thicker training object. Instead of fully inserting the training object, the user only partially inserts the training comfort as shown via Position 1 or 2. The user can continue repeating exercises at this fixed depth. Once acclimated, the user can increase the depth and continue exercises at that position. The user continues this progression until the 9 mm training device is fully inserted to the desired 16 cm depth. The same technique can be used with the training device of the next thickness, 10 mm, until it is also fully inserted to the desired 16 cm depth. Such gradual and precise control minimizes discomfort and gagging.

Figure 8:
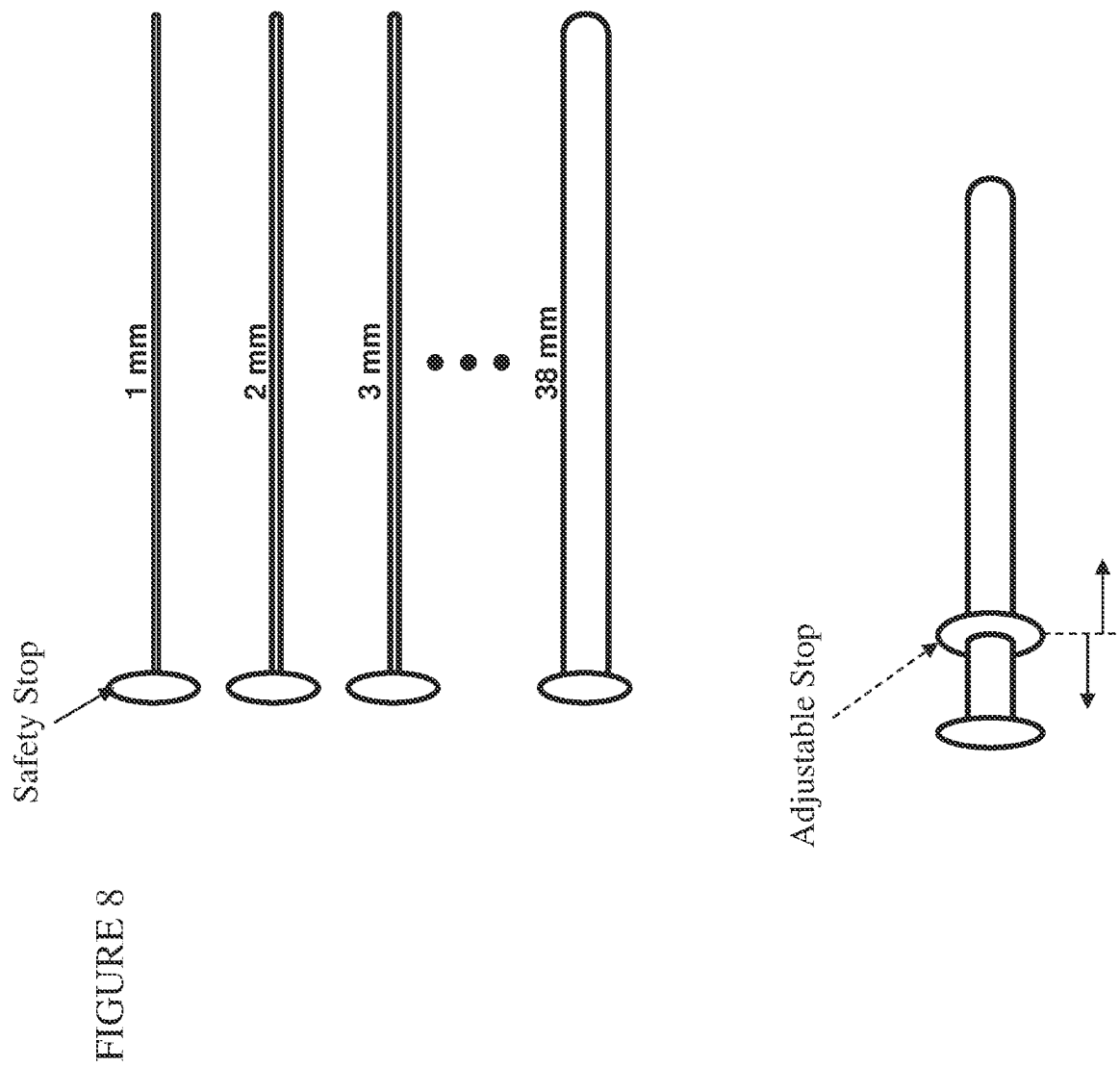
FIG. 8 illustrates examples of training apparatus of varying thickness.
Figure 11:
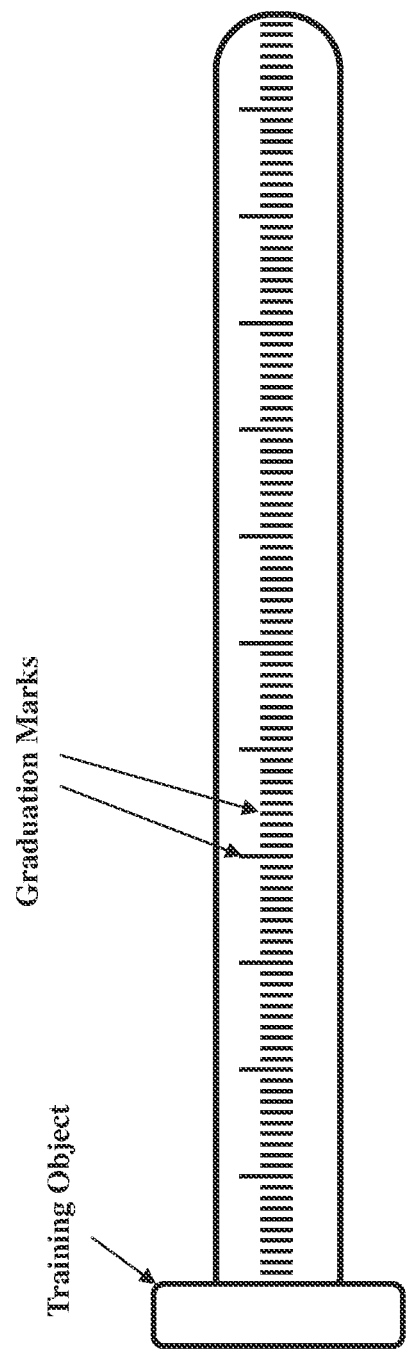
FIG. 11 illustrates an exemplary training device exhibiting graduation marks.

The device of the present application is specifically designed to enable the user to acclimate to a specific target object in the mouth and throat over time through daily exercises. The fellatio training objects resemble silicone cords or lengths of varying thickness. Each training device is optimally designed for a specific training step in a progression of gradually increasing device thicknesses as shown in FIG. 8. This approach allows the user to continually control and limit his or her level of training discomfort. In at least one embodiment, the surface of the device incorporates graduation markings or measurements (see FIG. 11) to allow one to visualize and target a certain position in the device.

Referring now to FIG. 6, shown is an embodiment of the present invention (similar to that shown in FIG. 8) with a simple, optional, adjustable clamping mechanism that can provide multiple, precise depths depending on the position of the adjustable clamping mechanism. The device generally includes a device body, a retainment protrusion, and the adjustable clamping mechanism. The retainment protrusion may be a disk affixed to one end of the body of the device. The body of the device may be of varying lengths and thicknesses as selected by the user.

The adjustable clamping mechanism is an optional component of the present application. Positioning the user's tooth against the front surface of the adjustable clamping mechanism provides one depth and positioning the clamp against the back of the tooth provides an incremental depth. Here, the adjustable clamp is an annular ring that encircles the device body. The adjustable clamp may have a friction fit with the device body or may have a closure mechanism that may be selectively opened and closed. Further, the adjustable clamping mechanism itself may have its position along the body of the device adjusted, as necessary.

Figure 12:
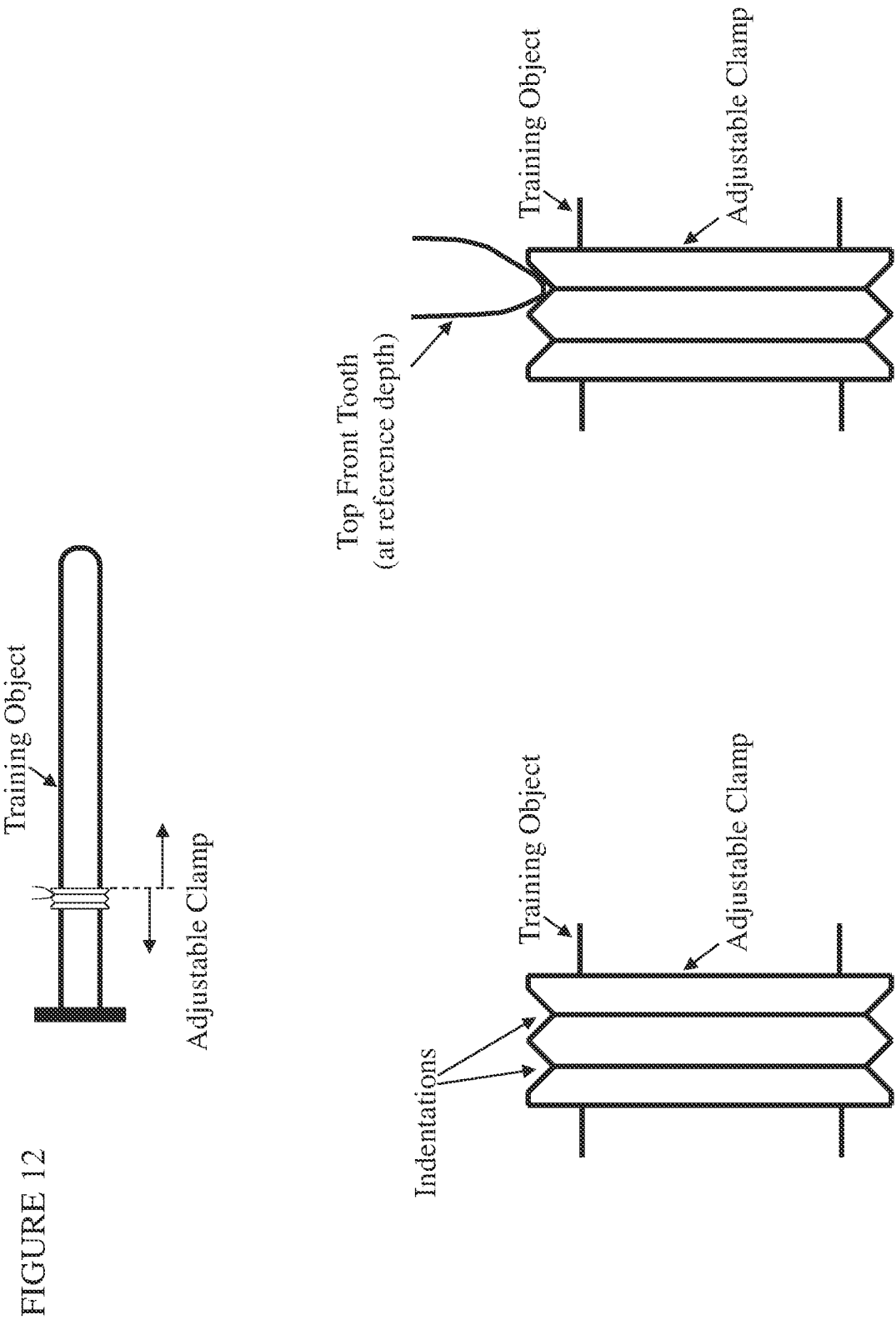
FIG. 12 illustrates a training device utilizing another adjustable clamping mechanism.
Figure 13:
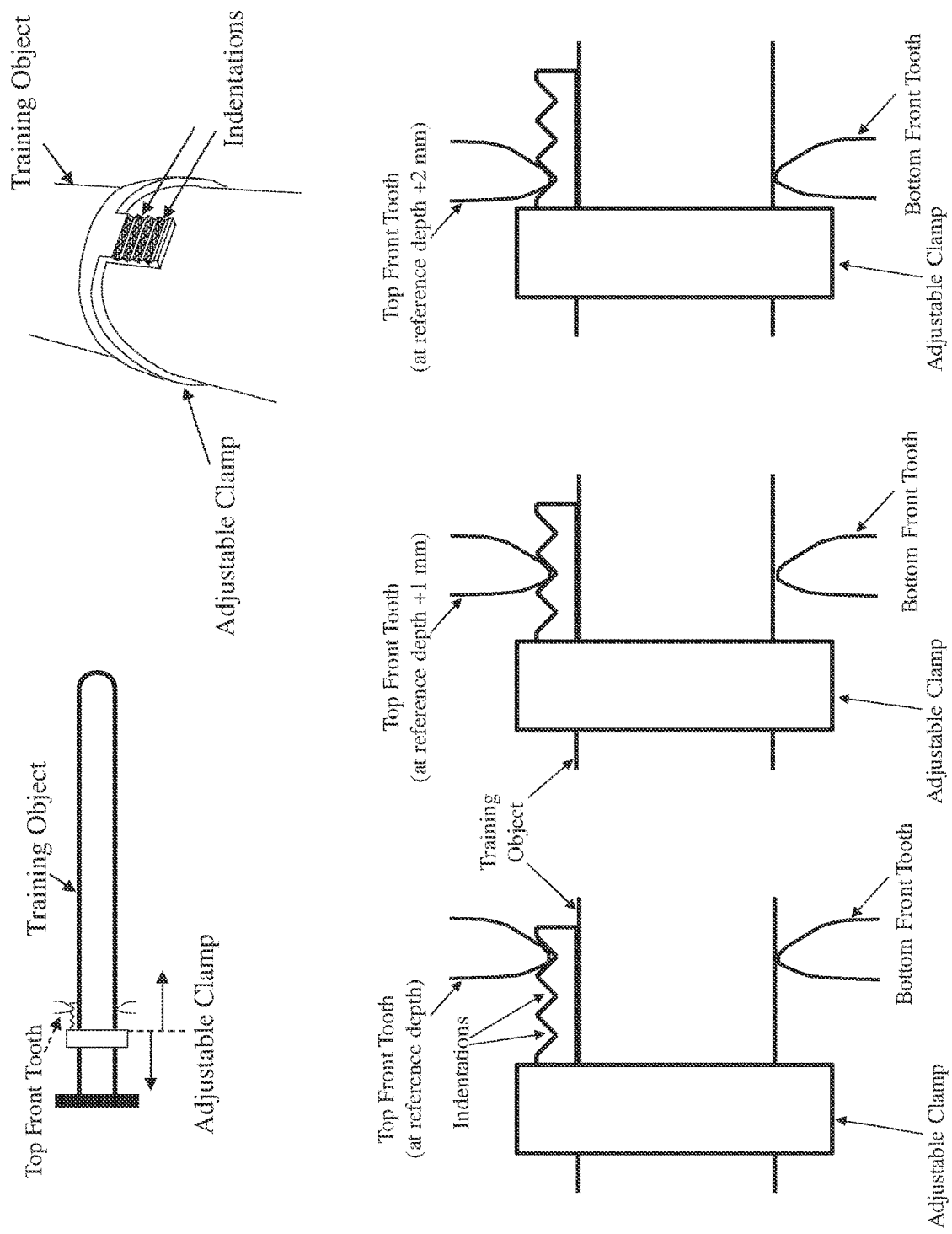
FIG. 13 illustrates a training device utilizing yet another alternative adjustable clamping mechanism.

Variations of this adjustable clamping mechanism are shown in FIGS. 12 and 13. Here, are shown examples of an enhanced clamp mechanism design, providing additional precision of depth control. The adjustable clamping mechanism itself can be shaped in various ways to provide multiple depth increments, using the user's tooth (or teeth) as a reference point.

FIG. 12, for example, shows an example of an adjustable clamping mechanism, shaped with at least two indentations to fit at least one tooth such as a front tooth. The two indentations, plus the adjustable clamping mechanism's frontal edge and rear edge form a total of four possible depths which the user may select. Here, the adjustable clamping mechanism is an annular ring that encircles the device body. The adjustable clamp may have a friction fit with the device body or may have a closure mechanism that may be selectively opened and closed. The opening and closing of the adjustable clamping mechanism allow for the selective placement of the adjustable clamping mechanism along a length of the device body. The number of indentations on the adjustable clamping mechanism may vary and may be between 1-10. Each indentation may have similar or different dimensions compared to one another.

Referring now to FIG. 13, there is an alternate version of the adjustable clamping mechanism. Here, the indentations are not part of the annular ring but rather an extension therefrom. This extending member extends laterally from a sidewall of the annular ring. In at least one embodiment, each indentation may be equidistant from one another and allow for a difference of 1 mm in distance between the indentations. As with the embodiment shown in FIG. 12, the number of indentations on the adjustable clamping mechanism may vary and may be between 1-10. Each indentation may have similar or different dimensions compared to one another.

Ideal oral acclimation training objects are sufficiently aversive to facilitate re-education but not excessively aversive to cause severe gagging. This goal should be ideally achieved for all training steps, from start to finish. The first training device of the progression must therefore be sufficiently thin and has a low coefficient of friction to minimize gagging. The first training device may, for example, resemble a thin body (akin to a cooked spaghetti strand) to ease physical and emotional acclimation, since most people are accustomed to swallowing spaghetti. This maximally leverages familiarity, reduces apprehension/fear, minimizes gag probability and eases acclimation. The user learns to become comfortable with the training device after repeated exercises and eventually decides when to progress to the next training object, which is only slightly thicker and which some users may find imperceptible. This approach ensures gradual and precise stimulus progression, thereby reducing the probability of indiscriminate gagging and psychogenic gagging, during the entire training progression.

In addition to the "smooth" device there may also be devices that incorporate a texture to the outer surface of the device. Stimulus intensity can be controlled by how the surface of a training device interacts with the surfaces of the mouth and throat. This aspect can therefore be used to offer finer control over the stimulus progression. Surfaces of the training device can be characterized by coefficient of friction, tackiness, and roughness. Varying these characteristics can provide additional means of varying stimulus intensity.

Surface friction of training objects can be reduced by applying certain coatings such as parylene, polytetrafluoroethylene, or other low-friction coatings, but this would also increase cost. Such coatings would ideally be made with antimicrobial properties to reduce bacterial growth. Special attention may be given to the first training object since it establishes the basis of the user experience. Success for this training object greatly increases the chances for overall progression success. Likewise, a bad experience with the first training object could cause the user to stop all training. The first training object is also designed to mimic the slipperiness and softness of thin, cooked spaghetti. Thin spaghetti, however, is extremely flexible and is impossible to position into the back of a person's mouth. Therefore, this invention has the optional embodiment of a very thin metal core in the training object to provide some degree of rigidity while maintaining surface softness.

Figure 9A:
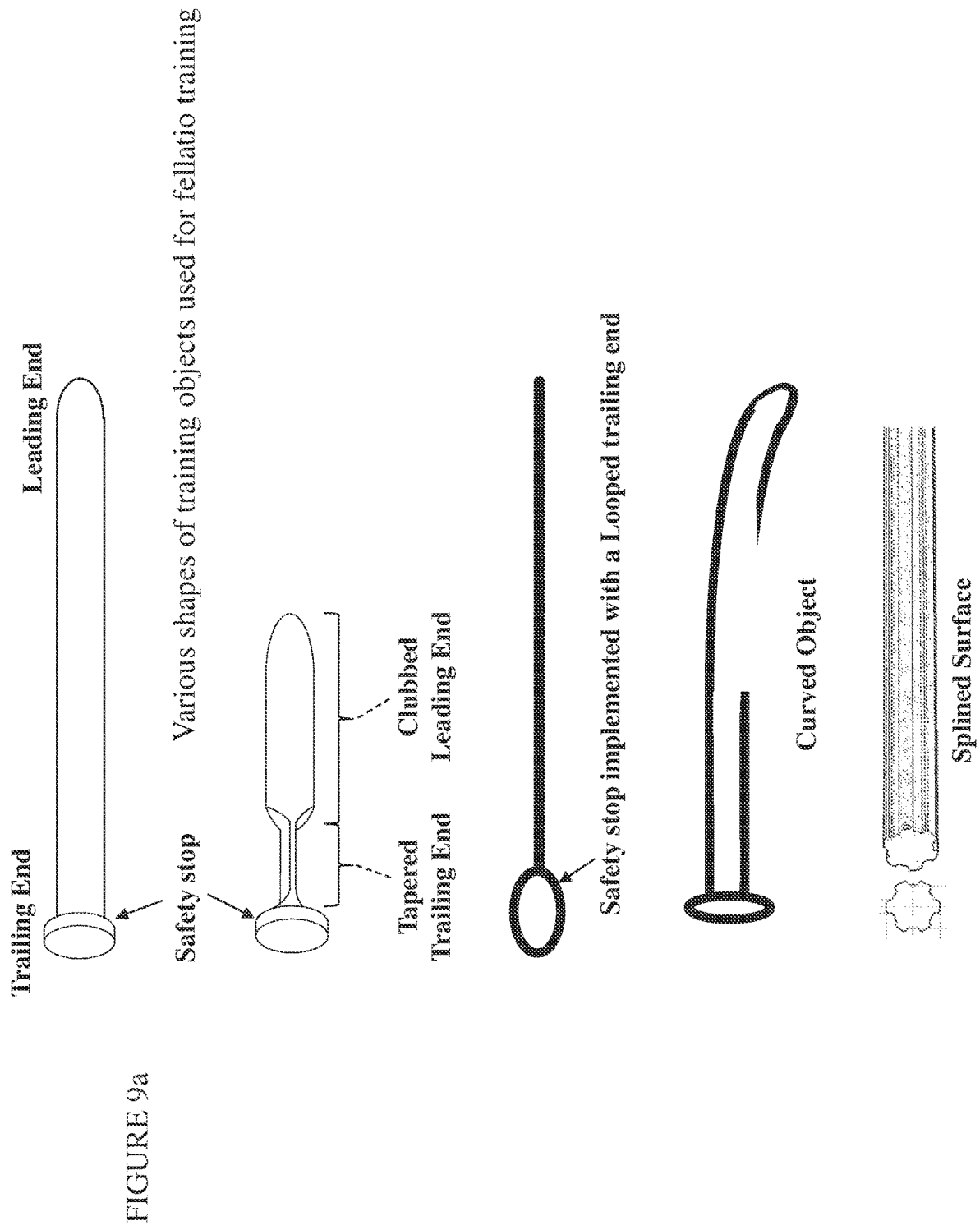
FIG. 9a illustrates various shapes of an exemplary training device used for fellatio training.
Figure 9B:
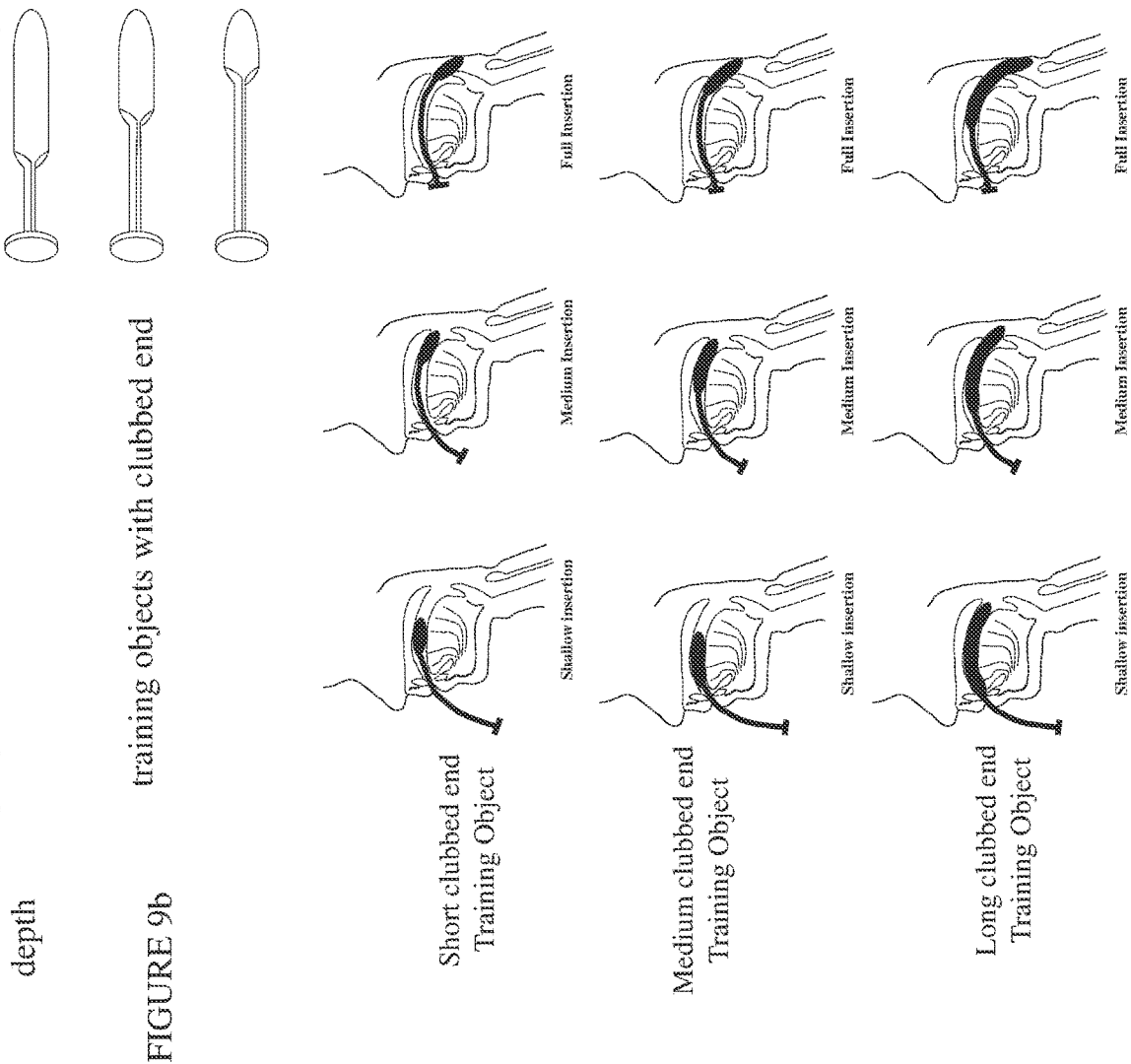
FIG. 9b illustrates how three sizes of the "clubbed" training object can be used in a fellatio training progression.
Figure 9C:
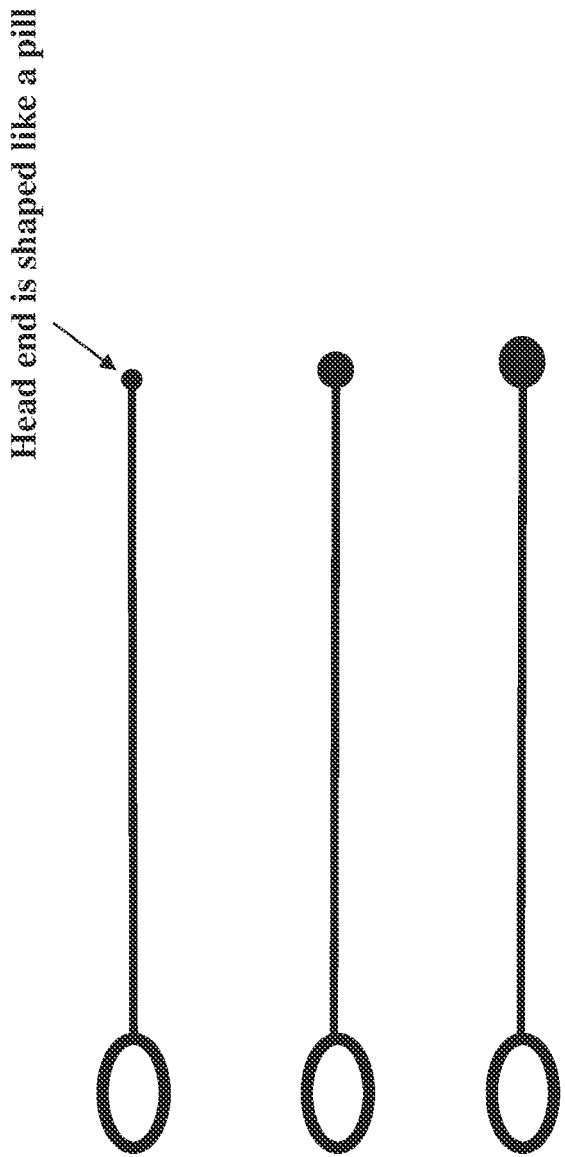
FIG. 9c illustrates is an example of training objects used to train a user to swallow pills.
Figure 10:
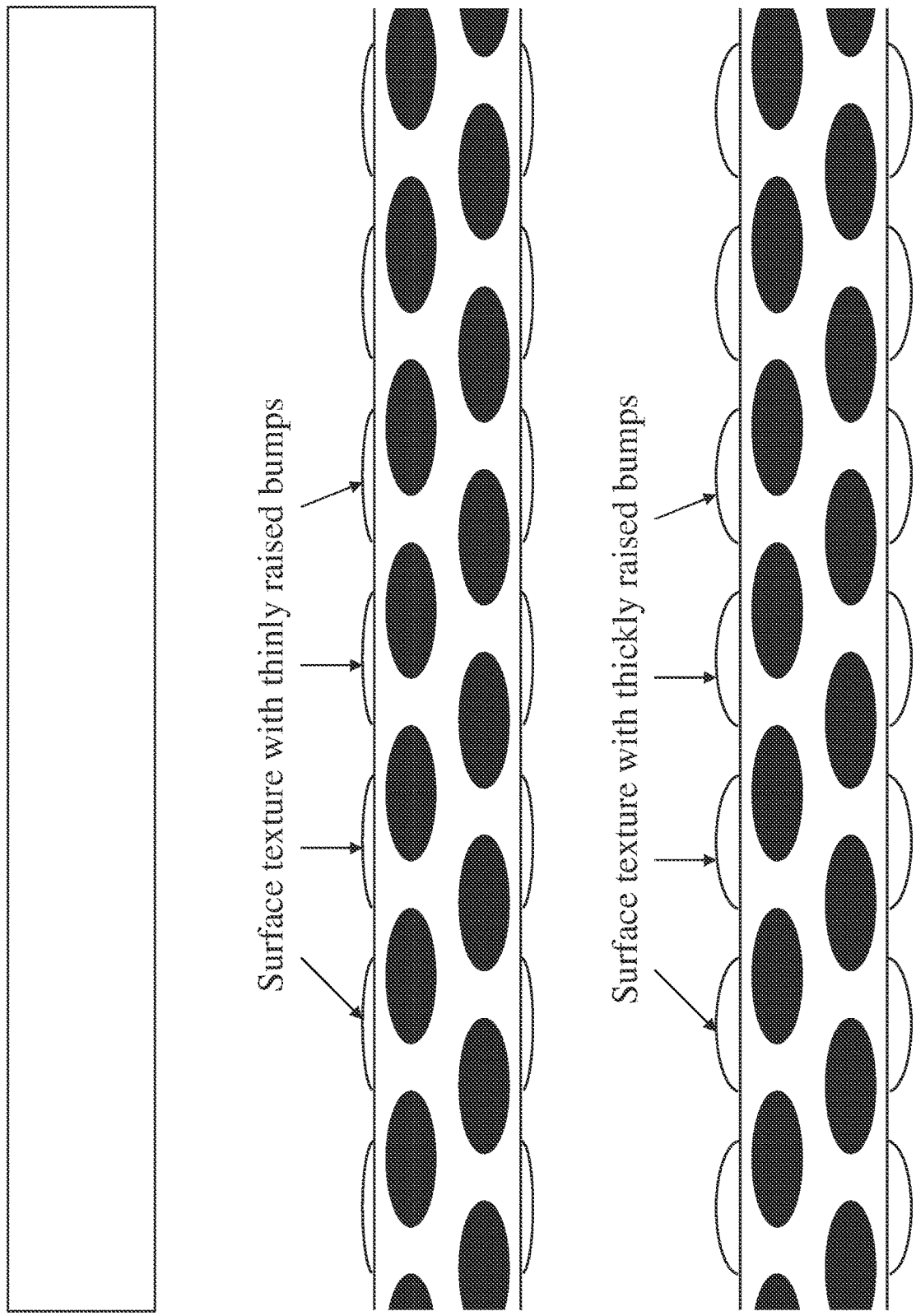
FIG. 10 illustrates another exemplary training device exhibiting three surface textures to control aversion.
Figure 15:
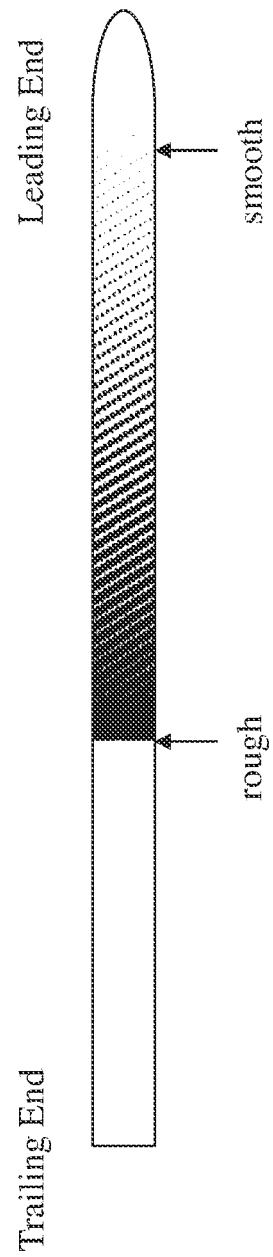
FIG. 15 illustrates an exemplary training device exhibiting a graduated texture.

Shapes and surface textures (e.g. bumps, crosshatch, random, etc.) as shown in FIGS. 9, 10, and 15 can increase tactile roughness and provide an additional means of controlling stimulus intensity.

Referring to FIG. 9a, the shape of the device may include a rounded leading edge (to ease entrance into mouth and throat) and a retainment protrusion to prevent ingestion. The "tapered trailing end" shape enables the mouth to be nearly closed for increase comfort, The "clubbed leading end" features reduced surface area (for increased comfort, decreased aversion, decreased gagging probability). The "safety stop" can be implemented with a shape that resembles a disk. Another safety stop implementation is shown as a loop. The "curved object" approximates the natural curve of the mouth and throat for increased comfort. The "splined surface" is another method of reducing surface area (for increased comfort, decreased aversion, decreased gagging probability). It may also facilitate mucus flow while training.

In one embodiment there is a tapered leading edge to ease acclimation and size expansion. In yet another embodiment there is a tapered trailing edge configured to allow the mouth to be partially closed even when training with large diameter training objects to reduce discomfort. In yet another embodiment there is a splined or slotted surface configured to reduce contact with sensory receptors. Splining also enables saliva/mucus flow (i.e. reduces mucus buildup in the throat) and airflow, which can be particularly helpful with large thickness training objects. Thicker devices may have a curved shaped to fit the natural curvature of the mouth and throat as shown in FIG. 9a.

As previously noted, one embodiment of the present invention is directed to several plain training objects that form a thickness expansion (no special depth, finish, texture, or shape controls). But additional stimulus controls, as mentioned above, can be combined within the training progression. As shown in FIG. 10, instead of having a stimulus progression that simply increments from one thickness to the next, additional training objects can be inserted within the thickness progression to provide additional intermediate stimulus through texture control, for example. Below is an example of how surface texture can be varied with three training objects of the same thickness, thereby gradually increasing stimulus with each device having no surface texture, having a lightly rough intermediary texture (e.g. thinly raised bumps), which slightly increases stimulus, and having a rougher texture (e.g. thickly raised bumps).

The textures are not mutually exclusive and varying textures may be combined in a unique fashion onto one device body as shown in FIG. 15. Here, the device has a smooth (minimally averse) leading end. The smooth texture gradually changes to rough. Other combinations of texture transitions, as well as types of textures, may be varied as needed.

Figure 14:
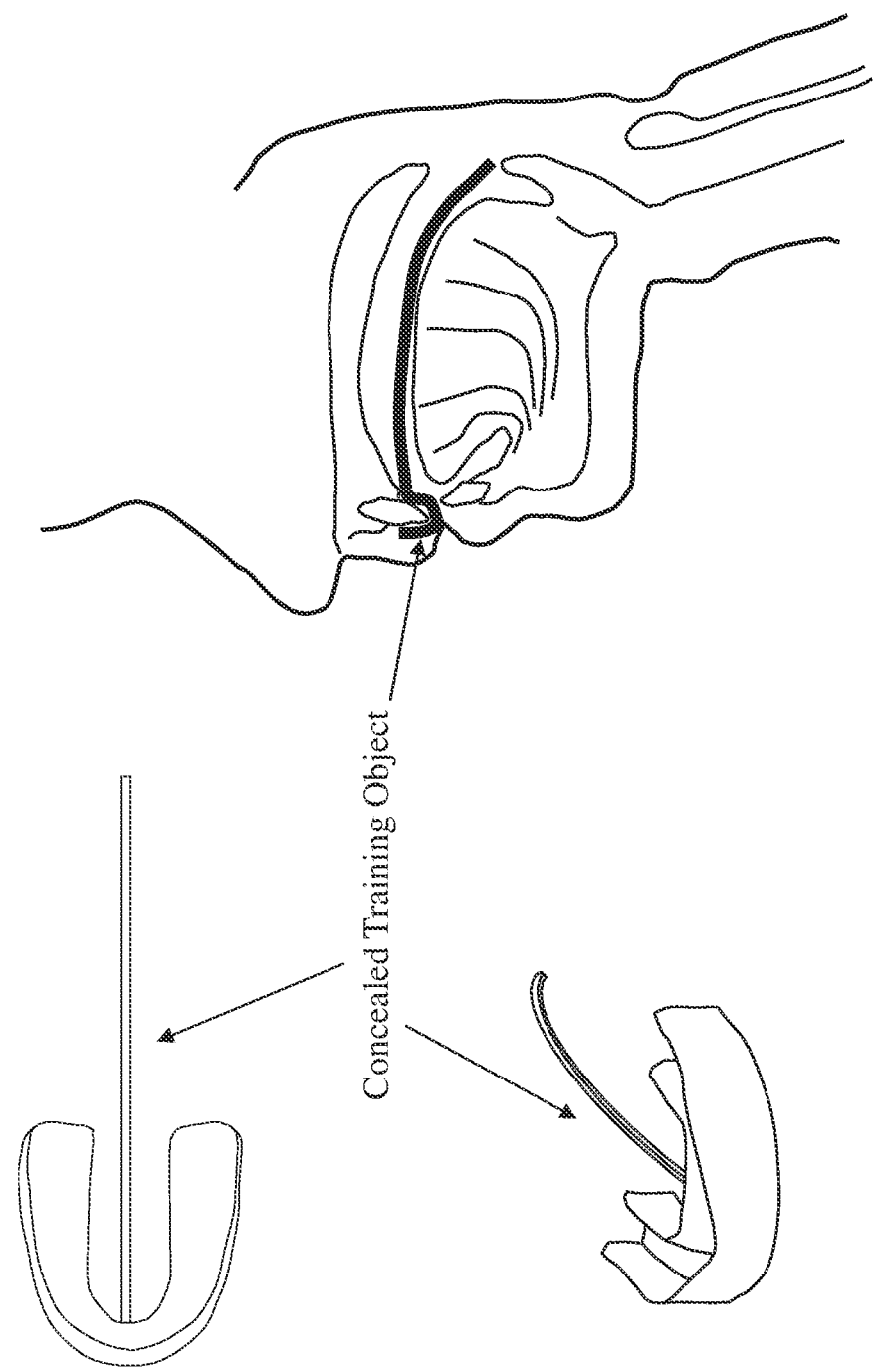
FIG. 14 illustrates another embodiment of the training device enabling the user to close their mouth while in use.

In at least one other embodiment the device may be combined with a secondary item such as a mouthguard to offer concealed training, extended-duration training (e.g. while sleeping), hands-free training, and to help with retainment as shown in FIG. 14.

In at least one other embodiment, the device is configured to provide an additional control of stimulus intensity through "softness control" by constructing a training object with an internal material that is much softer than traditional silicone. Silicone foam, for example, is highly flexible and offers less surface pressure on sensory nerves which reduces the tendency to gag. This embodiment may be particularly helpful for a user with a highly sensitive gag reflex.

In at least one other embodiment, the device is configured to include an embedded metal wire to help form a user-defined bend/curve. The metal wire is preferably selected for material, thickness, etc. to allow the device to be selectively bent and retain that bend or shape until otherwise modified by the user.

In at least one other embodiment, the device may include an internal wire, plastic, or other internal support to prevent the user's teeth from cutting through the device.

In at least one other embodiment, the device, particularly "larger" devices, may embed a small vibrating device or pulsating device for an increased and controllable stimulus. An embedded wire or other object may help to transfer vibrations along a length of the device.

In at least one other embodiment, the device may have an inflatable or expandable portion that allows for continuously variable thickness within a certain range.

In at least one other embodiment, the device is comprised of a partially conductive material to accommodate Transcutaneous Electric Nerve Stimulation (TENS) technology.

Optimized Training Method

Errorless learning is a particularly effective gag suppression technique, used by dental clinicians, whose goal is to avoid the psychogenic association of gagging to the training object (e.g. dentures). While systematic desensitization attempts to minimize negative experiences (e.g. gagging), errorless learning, attempts to eliminate them. A patient using systematic desensitization, is expected to cope with the aversive stimulus for "as long as possible", that is until the patient gags. Occasional gagging therefore remains part of the re-education process. Ideally, a patient using errorless learning makes no errors (i.e. gagging) while developing only the desired response to stimuli. Avoiding the psychogenic association of gagging to the training object is particularly important in the early stages of training. The reduced number of error experiences is known to reduce the propensity to form or reinforce an expectation of future errors. Errorless learning has the important advantage of accommodating users with a highly sensitive gag reflex and/or users who are anxious or apprehension about training (since anxiety and apprehension are known to increase gagging probability).

It is therefore important that a user starts training with an object that is optimally designed to (1) introduce the user to the training process yet (2) maximizes comfort and minimizes gagging probability. Maximizing comfort is accomplished psychologically and physically by designing the training object to mimic a thin strand of cooked spaghetti which the user is presumably familiar and comfortable within their mouth and throat. The starting training object is soft, smooth and slippery, with a low coefficient of friction.

It is therefore important that there is minimal/tolerable discomfort as a user transitions from one training object to the next training object within the training progression. This invention accomplishes that by offering various intermediate kits to accommodate the user's gag reflex sensitivity (low, medium or high).

In a preferred embodiment, a user begins training in accordance with the present device with a "beginner kit" and then continues with an "intermediate kit". The beginner kit consists of the first ten training objects. Other training kits may contain more or less training objects or devices. A beginner kit is intended to introduce a user to the objects and the associated training methodology. It is recommended that the user log their daily progress and observations (e.g. level of discomfort, rate of progress, etc.). All the beginner kit exercises will likely be completed relatively quickly and easily for a user with a low gag sensitivity. Conversely, the same exercises will take more time and effort for a user with a high gag sensitivity. A simple formula can therefore convert the logged data (progress) to an estimated gag sensitivity level, such as low, medium, or high. Besides the beginner kit, a preferred embodiment includes three types of "intermediate kits" associated with a user's low, medium or high gag sensitivity. The user can therefore complete their training goal by selecting the intermediate kit that is best suited for their sensitivity level. The recommended training schedule is nominally once or twice per day, at least five days out of the week, for about five to about twenty minutes. In some instances, more or less time and/or frequency may be applicable and may produce faster results. However, this approach also enables the rate of training progress to be controlled by the user's choice of comfort level (i.e. sensitivity level). The rate of training progress can be accelerated, to some degree, when the user chooses to endure more discomfort, if it is not excessive enough to significantly contribute to psychogenic gagging.

The embodiments of the present application offer various means of controlling and gradually increasing stimulus intensity so that the user cannot easily perceive a specific stimulus increment. Such controls can be used to tailor a training kit for a user's gag sensitivity as shown. Controls include thickness, surface finish, surface texture, firmness, and shape variations. Each of these is described in more detail herein.

The progression of device thickness becomes a surface area expansion within the mouth and throat. A smaller thickness increment becomes a small expansion of surface area which may be appropriate for a person with a highly sensitive gag reflex. A person with a low gag sensitivity can tolerate larger thickness increment(s).

As previously discussed in FIG. 8, there is an example of a gradual thickness progression, with each object's thickness expanding in 1 mm increments, thereby requiring 37 different training objects to reach a target goal of 38 mm. Such a progression example might be appropriate for a person with a highly sensitive gag reflex since each increment is small and tolerable. This progression may also be appropriate for those who use the errorless learning method. A person with a low gag sensitivity may not need such a gradual thickness progression and they may be able to tolerate a larger thickness increment. The same 38 mm thickness goal, for example, can be achieved with, for example, seven intermediate training objects, using a 4 mm thickness increment as shown in Table 1 below (see "Intermediate Kit A"). The following exemplary training kits can be assembled for specific levels of gag sensitivities: 1) High sensitivity gag reflex kit consists of Type A, Type B and Type C training objects with 1 mm thickness increment; 2) Medium sensitivity gag reflex kit consists of Type A and Type B training objects with 2 mm thickness increment; and 3) Low sensitivity gag reflex kit consists of Type A only training objects with 4 mm thickness increment.

TABLE 1

Example Thickness Progression of Various Training Kits

| Thickness (mm) | Starter Kit | Follow-on Kits A | B | C |
|---|---|---|---|---|
| 2 | 1 | | | |
| 3 | 1 | | | |
| 4 | 1 | | | |
| 5 | 1 | | | |
| 6 | 1 | | | |
| 7 | 1 | | | |
| 8 | 1 | | | |
| 9 | 1 | | | |
| 10 | 1 | | | |
| 11 | | | | 1 |
| 12 | | | 1 | |
| 13 | | | | 1 |
| 14 | | 1 | | |
| 15 | | | | 1 |
| 16 | | | 1 | |
| 17 | | | | 1 |
| 18 | | 1 | | |
| 19 | | | | 1 |
| 20 | | | 1 | |
| 21 | | | | 1 |
| 22 | | 1 | | |
| 23 | | | | 1 |
| 24 | | | 1 | |
| 25 | | | | 1 |
| 26 | | 1 | | |
| 27 | | | | 1 |
| 28 | | | 1 | |
| 29 | | | | 1 |
| 30 | | 1 | | |
| 31 | | | | 1 |
| 32 | | | 1 | |
| 33 | | | | 1 |
| 34 | | 1 | | |
| 35 | | | | 1 |
| 36 | | | 1 | |
| 37 | | | | 1 |
| 38 | | 1 | | |
| TOTAL NUMBER OF OBJECTS | 10 | 7 | 7 | 14 |

If a user procures a low-sensitivity intermediate training kit but later realizes that they would like a more comfortable (more gradual) training progression, the user could additionally procure the "Intermediate Kit B". The two combined kits form 14 unique training objects with a 2 mm thickness increment. Similarly, if the user wanted even more comfort, they could additionally procure the "Intermediate Kit C", which then forms a collection of 38 training objects with a 1 mm thickness increment. This approach therefore offers additional customization and adaptability while they are being trained.

Figure 16:
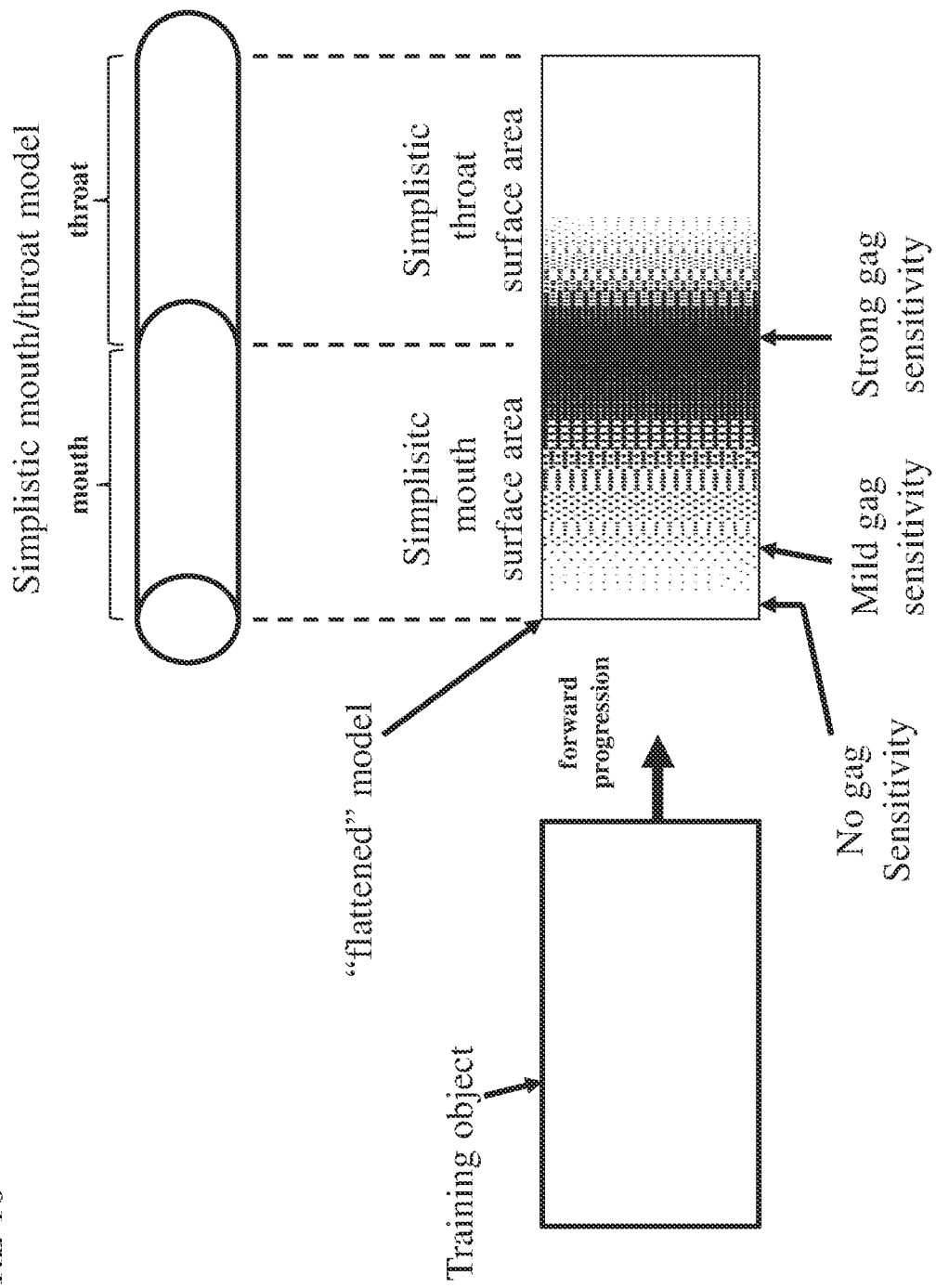
FIG. 16 illustrates a highly simplified model of the mouth and throat. This model is used to simulate gag reflex intensity for fellatio training as shown in FIGS. 17, 18, and 19.
Figure 17:
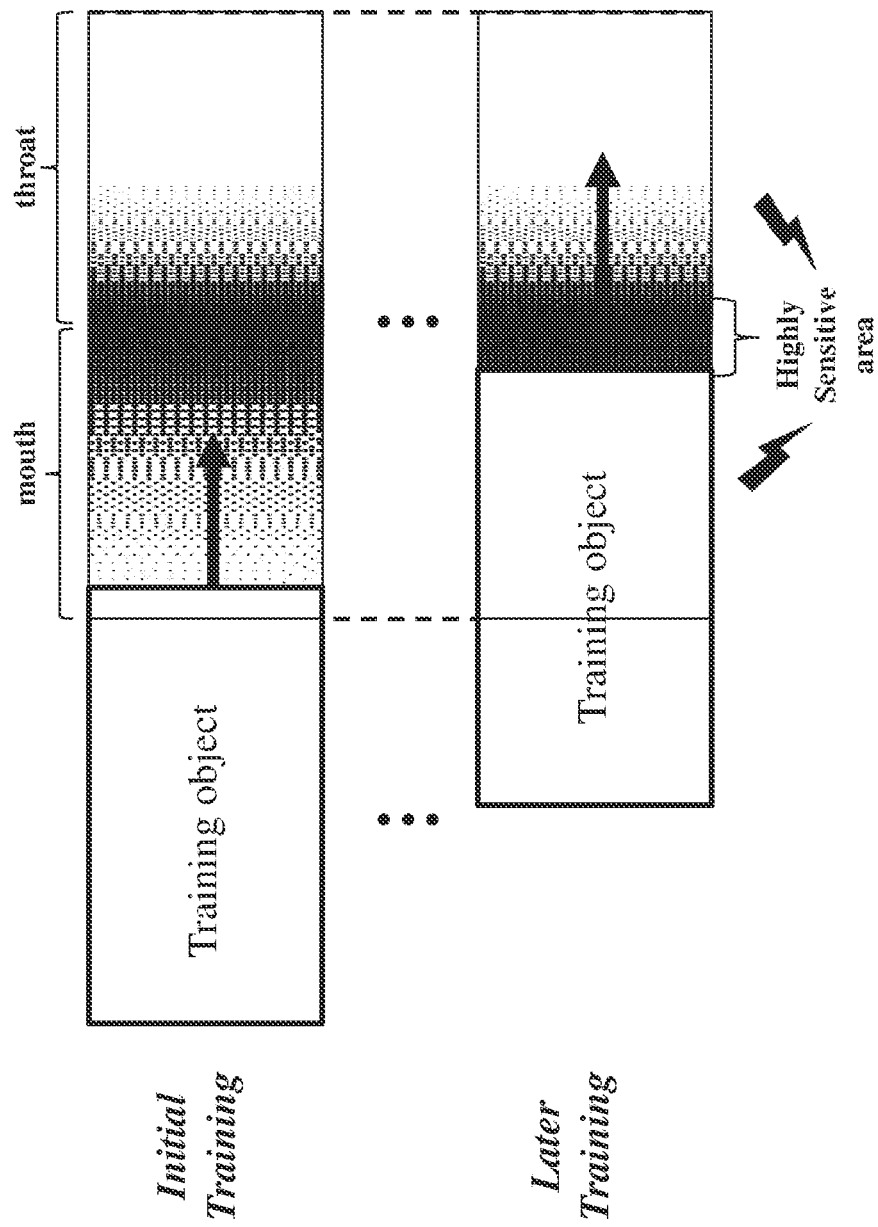
FIG. 17 illustrates a traditional "incrementing depth" training approach where a thick training object (e.g. dildo) is gradually inserted into the mouth and throat.
Figure 18:
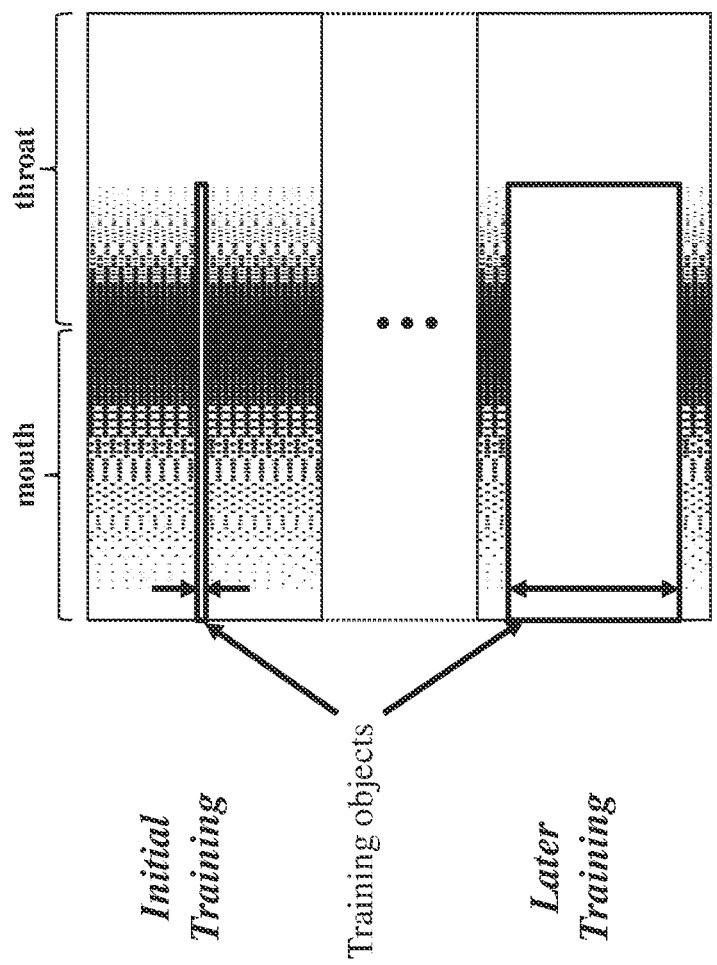
FIG. 18 illustrates using "incrementing thickness" training progression.

Training with the "intermediate kits" provide adequate acclimation for the target/representative object. "Advanced" training for more robust gag suppression is possible by increasing aversive stimuli through texture control as previously mentioned (FIG. 10). FIG. 9b shows "clubbed" training devices which feature increased thickness but reduced surface area to increase comfort while decreasing the probability of gagging. Such objects may be combined to form an "advanced training kit" which may be particularly helpful for maximum thickness training. Traditional fellatio gag suppression training methodologies, using a dildo, are compared to that of the present application by using a simplistic simulation model as shown in FIG. 16. This representative model is not intended to map an actual mouth and throat but is only used to illustrate basic concepts. The simplistic mouth/throat (tube) is opened and "flattened" as a rectangular surface area. The "flattened" surface is shaded with several non-linear regions of gag sensitivity as shown above. Training with the traditional (depth control) approach and invention (thickness control) approach are both simulated with the same model over an arbitrarily chosen 70 days.

Figure 19:
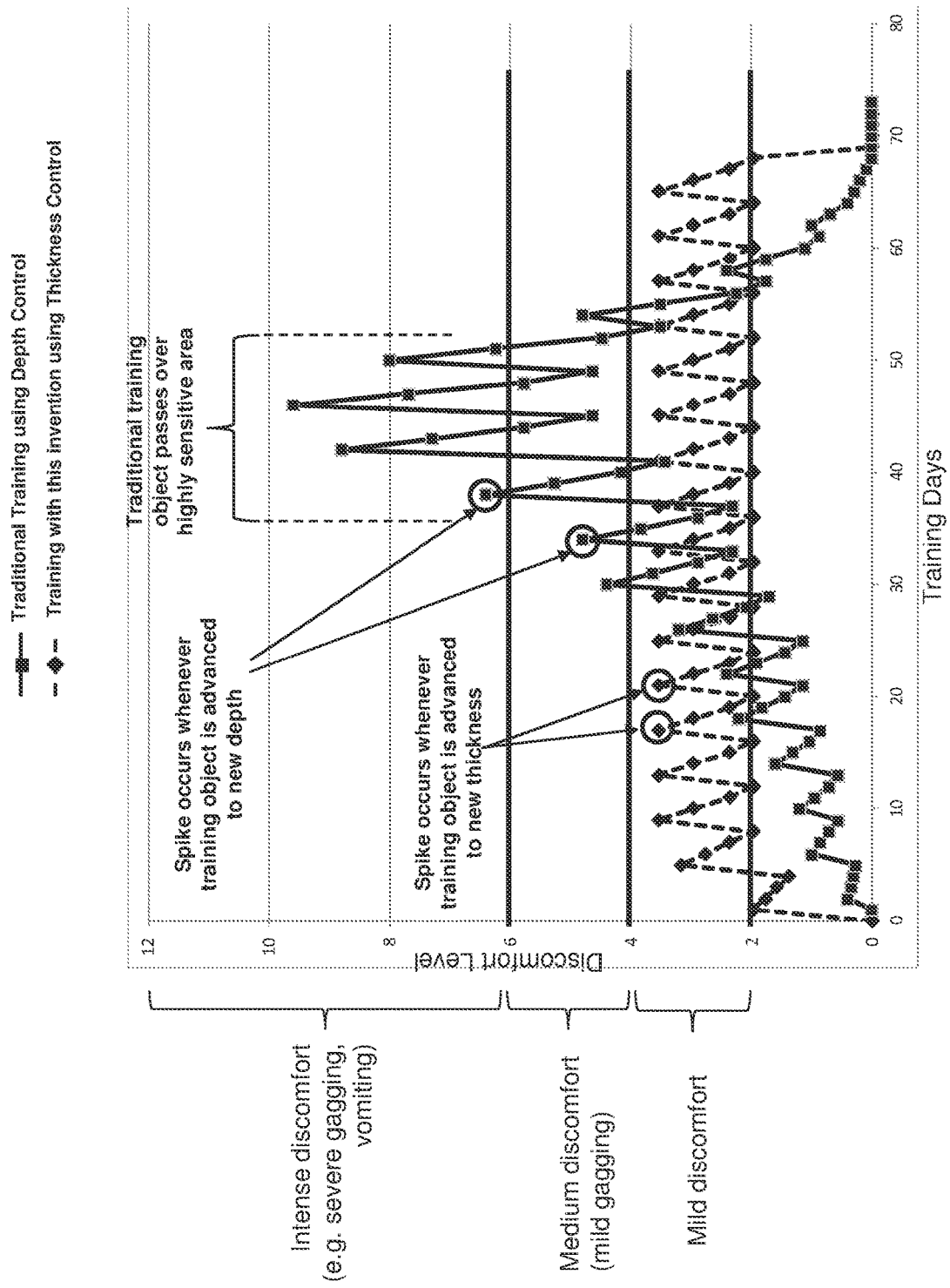
FIG. 19 graphs gagging intensity using a simplistic simulation of traditional training (as shown in FIG. 16) compared to training with an embodiment of the present invention's thickness expansion progression (as shown in FIG. 17).

Traditional training, using the simplified dildo model, is first positioned at the threshold of gag sensitivity. The same position is used for the next four days to train/condition the gag reflex in that area. Then, the device is positioned a little farther into the mouth and this new position is used for the next four days. The simulated progression continues in this manner, using 17 depth increments, until the device has completely passed across all associated mouth and throat surfaces (~70 days). The simplistic model assumes that gag sensitivity of a given area will be linearly reduced by about 10% for every day of training. A simulation of the simplified model is shown in FIG. 19 where the number of training days is shown on the x-axis and the amount of discomfort is shown on the y-axis. It is predictable that maximum discomfort (gagging) would be experienced when the training device first contacts "untrained" areas with highest sensitivity. Strong discomfort (e.g. gagging) is experienced with traditional training when the dildo passes across a highly sensitive surface area. The embodiments of the present invention, however, maintain a medium level of discomfort for the entire training progression. The obvious difference is that users of the traditional training method can expect strong and continual discomfort (e.g. distress, gagging, vomiting) for many days while the forward end of the large training object passes across highly sensitive surface areas. Such prolonged discomfort may contribute to psychogenic gagging. Conversely, this invention offers users significantly more control, less discomfort and minimal or no contribution to psychogenic gagging.

This illustrates a key benefit for the present application and also shows an important reason why the traditional/ "incrementing depth" training approach is often intolerable and problematic for the user.

Training with the thickness control of the present application is initiated with a thin training device that passes the entire length of mouth and throat. The user experiences only a small amount of discomfort since the initial training device is thin, has a low coefficient of friction and mimics a thin strand of cooked spaghetti or similarly situated object, with which the trainee is presumably familiar and comfortable. The same diameter training device is used for four days. The device is then replaced with a slightly thicker cord which has slightly more surface area. The training resumes for the next four days. The simulated progression continues in this manner using 17 chords until the thickest cord is used (exercising for ~70 days). The thickest training device theoretically contacts all the mouth and throat surfaces. Like the above traditional model, this model assumes that gag sensitivity of a given area will simply be reduced by about 10% for every day of training. Unlike the traditional method, there is no single event in the training progression that spikes the gag reflex. FIG. 9c shows example training objects used for learning to swallow pills. The user starts training with the smallest device and, after repeated exercises becomes acclimated to the object. The user then resumes training with the next larger device, and so on, until the desired size is achieved. This invention has the advantage of enabling a user to partially ingest the "pill end" and then remove it, so the user can gradually approach swallowing. This is unlike swallowing a small pill which, by necessity, moves only in one direction and is then ingested. This invention offers different and more aversive training since the "pill end" is partially ingested/swallowed yet later extracted, offering two predominate motions of stimuli. Unlike actual pills, this invention is reusable. This training could be combined with other training (e.g. fellatio, gastric tube, etc.) to offer the user a common/familiar training method which may provide an additional advantage.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. An oral acclimation training device comprising:
   a device body comprising a flexible and resilient material, the device body having a first end, a second end, a thickness, and a length;
   a safety disk directly affixed to a first end of the device body,
      wherein the safety disk has a width that is wider than that of the device body; and
   an annular clamping mechanism configured to be selectively retained along a length of the device body,
      wherein the annular clamping mechanism has a closure mechanism allowing the annular clamping mechanism to be selectively opened and closed,
      wherein the annular clamping mechanism further comprises more than one retainment indentation on an outer surface of the annular clamping mechanism configured to receive at least one tooth of a user,
      wherein the more than one retainment indentation are disposed laterally along a length of the annular clamping mechanism, and
      wherein the more than one retainment indentation are adjacent to one another.

2. A method of oral acclimation training to provide a psychological component to reducing gag probability, the method comprising the steps of:
   providing more than one oral acclimation training device of claim 1,
   wherein a size of the more than one oral acclimation training device is variable between each of the more than one oral acclimation training device, and
   wherein a size differential between the more than one oral acclimation device is configured to be imperceptible to a user;
   inserting one of the more than one oral acclimation device into a mouth of a user for a first period of time.

* * * * *